United States Patent
Brooksbank

(10) Patent No.: US 9,244,511 B2
(45) Date of Patent: Jan. 26, 2016

(54) TRANSIENT ELECTRICAL LOAD DECOUPLING FOR A DIRECT CURRENT POWER SUPPLY

(75) Inventor: John Brooksbank, Bradford (GB)

(73) Assignee: ECHOSTAR UK HOLDINGS LIMITED (GB)

( * ) Notice: Subject to any disclaimer, the term of this patent is extended or adjusted under 35 U.S.C. 154(b) by 691 days.

(21) Appl. No.: 13/569,800

(22) Filed: Aug. 8, 2012

(65) Prior Publication Data

US 2013/0257151 A1    Oct. 3, 2013

Related U.S. Application Data

(60) Provisional application No. 61/616,557, filed on Mar. 28, 2012.

(51) Int. Cl.
| | | |
|---|---|---|
| *H02J 3/00* | (2006.01) | |
| *G06F 1/30* | (2006.01) | |
| *G06F 1/26* | (2006.01) | |

(52) U.S. Cl.
CPC ............... *G06F 1/305* (2013.01); *G06F 1/266* (2013.01); *Y10T 307/297* (2015.04)

(58) Field of Classification Search
CPC ................. G06F 1/305; G06F 1/266
USPC ............................................ 307/17
See application file for complete search history.

(56) References Cited

U.S. PATENT DOCUMENTS

| | | | |
|---|---|---|---|
| 2007/0262641 A1* | 11/2007 | Stone | 307/10.1 |
| 2009/0102442 A1* | 4/2009 | Lai | 323/281 |
| 2010/0225171 A1* | 9/2010 | Rostami | 307/66 |
| 2011/0018344 A1* | 1/2011 | Liao et al. | 307/31 |
| 2012/0210143 A1* | 8/2012 | Amemura | 713/300 |

* cited by examiner

*Primary Examiner* — Jared Fureman
*Assistant Examiner* — Duc M Pham
(74) *Attorney, Agent, or Firm* — Kilpatrick Townsend & Stockton LLP

(57) ABSTRACT

Various arrangements for mitigating voltage droop in a direct current circuit configured to power multiple capacitive loads are presented. A voltage source configured to output a direct current voltage to power the multiple capacitive loads may be present. First and second outputs electrically coupled with the voltage source such that the outputs, when electrically coupled with capacitive loads, provide a voltage to the capacitive load may be provided. A transformer module (which may include a transformer and an impedance) electrically coupled with the first output and the second output may also be provided. When the first capacitive load is electrically coupled with the first output, the transformer may be configured to mitigate droop of the first voltage to the first output upon the second capacitive load being connected to the second output and receiving inrush current.

18 Claims, 11 Drawing Sheets

TRANSIENT ELECTRICAL LOAD DECOUPLING FOR A DIRECT CURRENT POWER SUPPLY

CROSS-REFERENCE

This non-provisional application claims priority to provisional application No. 61/616,557, filed on Mar. 28, 2012, entitled "Transient Electrical Load Decoupling for a Direct Current Power Supply." The entire disclosure of which is hereby incorporated by reference for all purposes.

BACKGROUND

In a typical Universal Serial Bus (USB) power circuit, a single voltage source supplies voltage to multiple USB outputs. As such, if USB devices are connected with the multiple USB outputs, each of these USB devices are drawing current from the same voltage source. While an ideal voltage source may be able to always output a constant voltage, real-world voltage sources cannot output an ideal constant voltage at least when the load connected with the voltage source changes rapidly.

For example, if a first USB device is connected with a first USB power output and is receiving current from the voltage source, the overall load connected with the voltage source may change when a second USB device is connected with another USB power output. This increase in load may result from the second USB device drawing current from the same voltage source. Upon initial connection to a USB power output, the second USB device may draw an inrush current due to components (e.g., capacitors) requiring initial charging, thus resulting in a transient electrical load on the voltage source. Due to the transient load caused by the second USB device being connected to the second USB power output, the voltage supplied to the first USB device may "droop." Such droop refers to a temporary decrease in the provided voltage. Such a temporary decrease in output voltage may affect the performance of the first USB device and/or may violate a defined standard that specifies a minimum voltage that a USB device should be supplied. The more isolated each output is from each other output, the less the amount of droop in supplied voltage may be present.

Conventionally, in order to decrease such droop (and increase isolation) when a second USB device is coupled with the same voltage source, each USB power output may be connected with some number of capacitors. Such capacitors may help reduce the amount of voltage droop when the load on the voltage source is increased by supplying current when the voltage output by the voltage source decreases. In a typical arrangement, each USB power output may be connected with a substantial number of capacitors, such as eight 10 µF capacitors, a 100 µF capacitor, and a 0.1 µF capacitor.

Use of such numbers of capacitors may have drawbacks. For example, if a large number of capacitors are used, the cost associated with acquiring the capacitors may be substantial, especially if a large number of circuits containing the USB power circuit are being manufactured. Further, the more capacitors used, the more circuit board space that is occupied and unavailable for other components. As such, a circuit board may need to be enlarged to accommodate all of the capacitors and/or other components may not be added to the circuit board because of the space needed for the capacitors.

SUMMARY

Embodiments detailed herein may reduce or remove the requirement for some or all electric energy storage devices (e.g. capacitors) conventionally used to maintain stable DC voltage supplies for distributed systems that present transient load changes, replacing them with magnetic energy storage. The stability of DC electric energy distributed to two or more switched or variable (transient) loads is conventionally improved with capacitors. Embodiments herein use magnetic energy storage (e.g., transformers) to replace electric energy storage devices.

In some embodiments, a system for mitigating voltage droop in a direct current circuit configured to power multiple capacitive loads is presented. The system may include a voltage source configured to output a direct current voltage to power the multiple capacitive loads. The multiple capacitive loads may comprise a first capacitive load and a second capacitive load. The system may include a first output electrically coupled with the voltage source such that the first output, when electrically coupled with the first capacitive load, provides a first voltage to the first capacitive load. The system may include a second output electrically coupled with the voltage source such that the second output, when electrically coupled with the second capacitive load, provides a second voltage to the second capacitive load. The system may include a transformer module, comprising an impedance, electrically coupled with the first output and the second output. The first capacitive load may be electrically coupled with the first output, the transformer module may be configured to mitigate droop of the first voltage to the first output upon the second capacitive load being connected to the second output and receiving inrush current.

Embodiments of such a system may include one or more of the following: The first output and the second output may be Universal Serial Bus (USB) outputs and the first capacitive load and the second capacitive load may be each USB devices. When the second capacitive load is electrically coupled with the second output, the transformer module may be further configured to mitigate droop of the second voltage to the second output upon the first capacitive load being electrically coupled to the first output and receiving a second inrush current. The first output may be connected to capacitors that provide less than 120 µF in capacitance on the first output. The second output may be connected to capacitors that provide less than 120 µF in capacitance on the first output. The first output may not be connected to any capacitors. The second output may not be connected to any capacitors. The transformer module may comprise either a tapped single winding transformer or a dual winding transformer. The impedance of the transformer module may be one or more resistors. The one or more resistors may be electrically connected between the first output and the second output. The one or more resistors may have a resistance of approximately four times an impedance of the voltage source.

In some embodiments, a method for mitigating voltage droop in a direct current (DC) circuit configured to power multiple capacitive loads is presented. The method may include coupling a transformer module with a DC voltage source, a first DC output, and a second DC output, wherein the transformer module comprises an impedance. The method may include providing a first output DC voltage to a first capacitive load connected with the first DC output. The method may include providing a second output DC voltage to a second capacitive load connected with the second DC output. The second capacitive load may be connected with the second DC output after the first capacitive load was connected with the first DC output. Upon connecting with the second DC output, the second capacitive load may draw an inrush current from the DC voltage source. The method may include mitigating, by the transformer module, droop in the first output DC voltage provided to the first capacitive load. Mitigation of the amount of droop may at least be partially due to magnetic flux induced by the inrush current increasing the first output DC voltage.

Embodiments of such a method may include one or more of the following: The first DC output and the second DC output may be Universal Serial Bus (USB) outputs. The first capacitive load may be a first USB device. The second capacitive load may be a second USB device. The method may include disconnecting the first capacitive load from the first DC output. The method may include connecting a third capacitive load to the first DC output. The method may include providing a third output DC voltage to the third capacitive load connected with the first DC output. The third capacitive load may be connected with the first DC output after the second capacitive load was connected with the second DC output. Upon connecting with the first DC output, the third capacitive load may draw a second inrush current from the DC voltage source. The method may include mitigating, by the transformer module, a second amount of droop in the second output DC voltage provided to the second capacitive load. Mitigation of the amount of droop may be at least partially due to magnetic flux induced by the second inrush current increasing the second output DC voltage. The first DC output may be connected to capacitors that provide less than 120-1 µF in capacitance on the first DC output. The second DC output may be connected to capacitors that provide less than 120-1 µF in capacitance on the second DC output. The first DC output may not be connected to any capacitors. The second DC output may not be connected to any capacitors. The transformer module may comprise either a tapped single winding transformer or a dual winding transformer. The impedance of the transformer module may comprise a resistor between the first DC output and the second DC output. The resistor may have a resistance of approximately four times an impedance of the DC voltage source.

In some embodiments, a circuit for mitigating voltage droop in a universal serial bus (USB) power circuit configured to power multiple USB devices is presented. The circuit may include a voltage source configured to output a direct current voltage to power the multiple USB devices. The multiple USB devices may comprise a first USB device and a second USB device. The circuit may include a first USB power output electrically coupled with the voltage source such that the first USB power output, when connected with the first USB device, provides a first DC voltage to the first USB device. The circuit may include a second USB power output electrically coupled with the voltage source such that the second USB power output, when connected with the second USB device, provides a second voltage to the second USB device. The circuit may include a transformer module, comprising an impedance, electrically coupled with the first USB power output and the second USB power output. When the first USB device is electrically coupled with the first USB power output, the transformer module may be configured to mitigate droop of the first DC voltage to the first USB power output upon the second USB device being connected to the second USB power output and receiving inrush current.

Embodiments of such a circuit may include one or more of the following: The circuit may include a power switch electrically coupled with the voltage source, wherein the power switch is configured to regulate an amount of current supplied to the first USB power output and the second USB power output. The circuit may include a first set of capacitors connected with the first USB power output, wherein the first set of capacitors provides the first USB power output with less than 120-1 µF of capacitance. The circuit may include a second set of capacitors connected with the second USB power output, wherein the second set of capacitors provides the second USB power output with less than 120-1 µF of capacitance. The impedance of the transformer module may comprise one or more resistors electrically coupled between the first USB power output and the second USB power output, wherein a resistance between the first USB power output and the second USB power output is four times an impedance of the voltage source.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Decreasing the number of capacitors used for decoupling transient electrical loads when a universal serial bus (USB) device is initially connected with a USB power supply may be desired. Decreasing the number of capacitors used for decoupling the transient electrical load for a USB power supply may free circuit board space and/or save money and manufacturing costs by decreasing the number of parts that need to be installed on a circuit board containing the USB power circuit.

Rather than using (only) capacitors to decrease voltage droop when a USB device is initially coupled with a USB power supply, a transformer may be used. The transformer may be used in conjunction with fewer, or possibly without, capacitors to counteract voltage droop due to coupling between USB power outputs. The use of the transformer may allow for the voltage to be increased on a first output when an increased amount of current is supplied to a second output, such as when the second output is initially connected with a capacitive load. In such an arrangement, each output may be coupled with a different winding of the transformer. As such, upon the capacitive load being connected with the second output, an inrush current may be supplied to the second output. In some instances, the capacitive load may draw a significant inrush current because, for instance, it may contain some number of capacitors that require charging from an uncharged state. The inrush current being supplied to the second output may result in an increase in the voltage supplied to the first output (that is, an increase over the amount of voltage that would be supplied if the transformer was not present) due to the magnetic flux induced in the transformer by the inrush current.

The use of such a transformer may sufficiently counteract voltage droop to satisfy the USB standard (such as Universal Serial Bus 3.0 Specification, Revision 1.0, Jun. 6, 2011, §11.4.4.1) for powering a USB device and allowing no more than a 330 mV voltage droop. As such, a transformer may be used instead of some or all of the capacitors that would typically be used in a USB power circuit to decouple capacitive loads connected to the same voltage source. It should be understood that while the following description makes reference to a USB power circuit, similar embodiments may be used to counteract voltage droop on other direct current (DC) circuits.

In various embodiments, due to the circuit topology, currents through the transformer's windings flow in opposition to each other, which may minimize the magnetic flux and volume of the core magnetic material required. As such, size and/or cost of implementing such embodiments may be reduced as compared to conventional arrangements.

Figure 1:
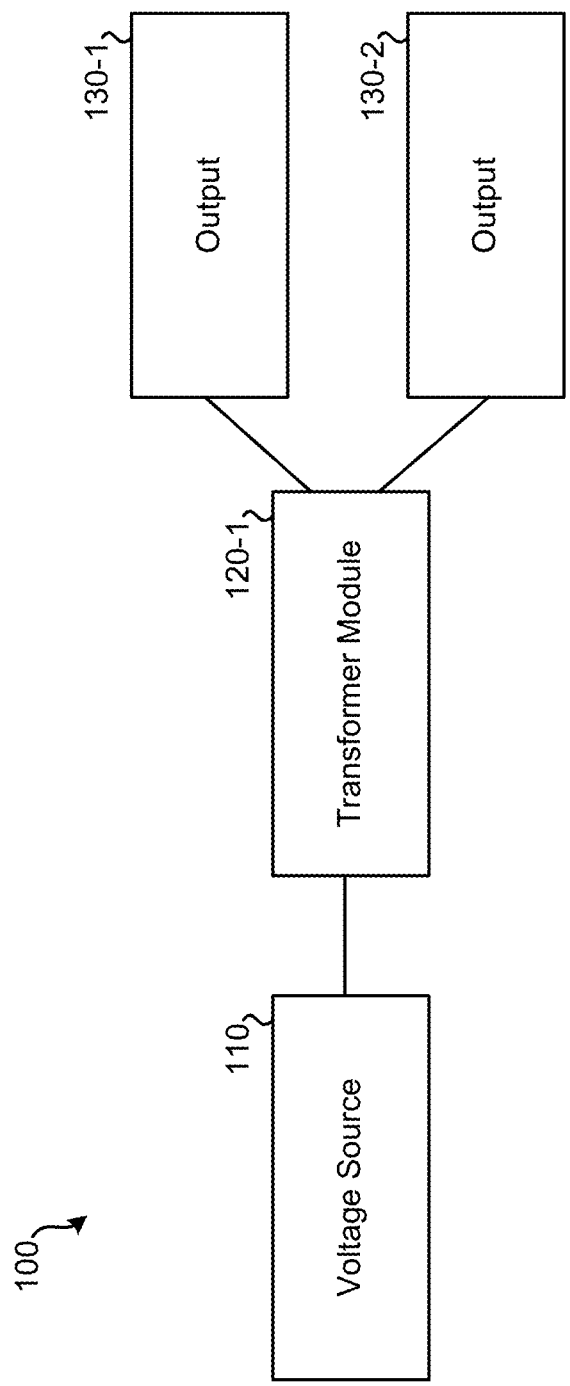
FIG. 1 illustrates a block diagram of an embodiment of a system for mitigating voltage droop in a direct current circuit configured to power multiple time variant loads, such as capacitive loads.

FIG. 1 illustrates a block diagram of an embodiment of a system 100 for mitigating voltage droop in a direct current circuit configured to power multiple time variant loads, such as capacitive loads. Capacitive loads may include direct current loads that vary with time, such as motors and incandescent lamps. Time variant loads may have an initialization current greater than the long-term average current. Examples may include incandescent lamps (metal filament) and electric motors. System 100 may include: voltage source 110, transformer module 120-1, and outputs 130.

Voltage source 110 may output a direct current (DC) voltage. This DC voltage may be generated using some other DC voltage or an AC voltage. Ideally, the DC voltage output by voltage source 110 remains at an ideal fixed voltage level, such as +5 V DC. As such, if the voltage source 110 is ideal, a rapid increase in load placed on the output to voltage source 110 would not affect the voltage level output by voltage source 110. However, a real-world voltage source may not be able to instantaneously adjust to changes in the load coupled with the output of the voltage source. As such, if a capacitive load is coupled with the output of voltage source 110, the DC voltage level output by voltage source 110 may decrease for a period of time when the capacitive load is drawing an initial inrush current. This decrease in output voltage level may be referred to as "voltage droop." In order to mitigate the amount of voltage droop when a capacitive load is coupled with voltage source 110, transformer module 120-1 may be coupled between voltage source 110 and outputs 130.

Transformer module 120-1 may comprise a tapped single-winding transformer or a dual-winding transformer. Transformer module 120-1 may further include an impedance, such as in the form of one or more resistors. Transformer module 120-1 may be coupled between voltage source 110 and outputs 130 such that if one of outputs 130 draws an increased amount of current (such as due to an inrush current), the voltage supplied to the other output will have less voltage droop than if transformer module 120-1 was not present. This may be due to the magnetic flux induced by the inrush current in a first winding of the transformer causing an increase in voltage on the other winding of the transformer (in a dual winding transformer).

Transformer module 120-1 may be electrically coupled with outputs 130. Output 130-1 and output 130-2 may both use voltage source 110 as a power source. Ideally, output 130-1 and output 130-2 would be completely decoupled, such that a change in load on one output of outputs 130 does not affect the other output of outputs 130. As such, a change to the capacitive load on output 130-1 may affect the voltage received by output 130-2. Similarly, a change to the capacitive load on output 130-2 may affect the voltage received by output 130-1. If system 100 is a USB power supply, outputs 130 may represent USB ports to which USB devices may be connected and disconnected while the USB power supply is powered on. These USB devices may receive some or all of their power from the USB power supply. Each of these USB devices may be modeled as a capacitive load. As such, when initially connected to one of outputs 130, each USB device may draw an inrush current, such as to charge capacitive components (such as capacitors) within the USB device.

Figure 2:
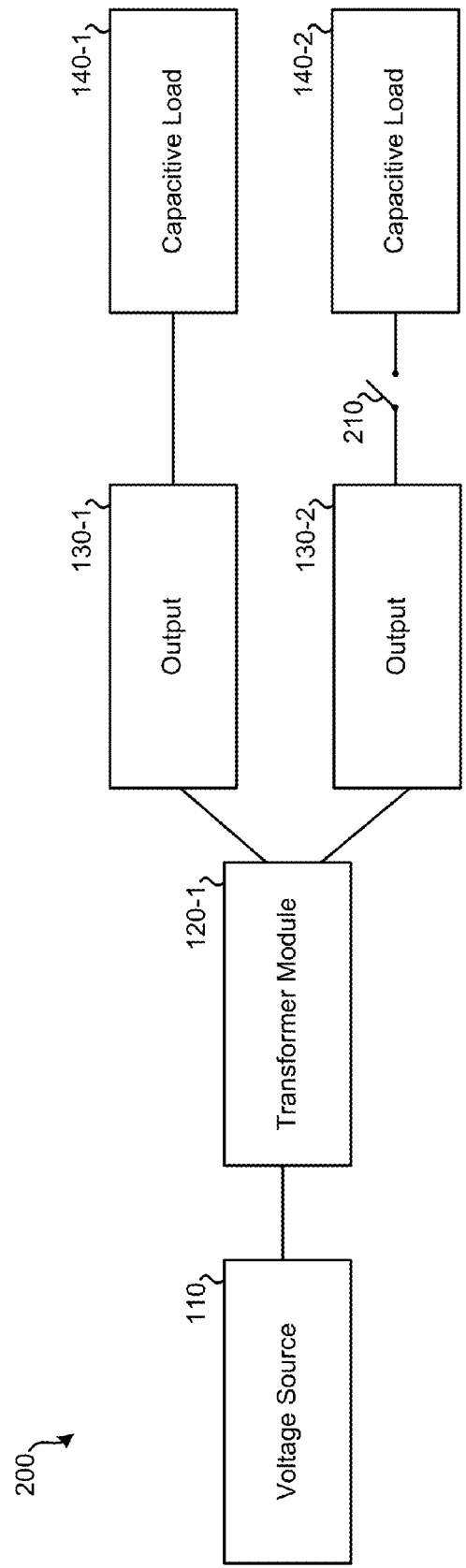
FIG. 2 illustrates another block diagram of an embodiment of a system for mitigating voltage droop in a direct current circuit configured to power multiple capacitive loads.

FIG. 2 illustrates a block diagram of an embodiment of a system 200 for mitigating voltage droop in a direct current circuit configured to power multiple capacitive loads. System 200 represents system 100 in which a capacitive load 140-1 connected with output 130-1 and a capacitive load 140-2 that is connected with output 130-2 at a time after output 130-1 was connected with capacitive load 140-1.

In the illustrated embodiment of system 200, capacitive load 140-1 is connected with output 130-1. As such, voltage source 110 supplies a voltage that serves as the power supply to capacitive load 140-1 via transformer module 120-1 and output 130-1. Ideally, the direct current voltage received by capacitive load 140-1 from voltage source 110 would remain constant, with no voltage droop when capacitive load 140-2 is connected with output 130-2 (that is, capacitive load 140-1 and 140-2 would be completely decoupled). Capacitive load 140-2 is initially disconnected from voltage source 110 as indicated by switch 210 being open. While switch 210 may be used to connect and disconnect capacitive load 140-2 from output 130-2, switch 210 may also represent other situations where capacitive load 140-2 may be disconnected from output 130-2 and may be subsequently connected. For example, a USB device that is initially disconnected may be physically plugged into a USB port while the USB power system is operating and, possibly, powering one or more other USB devices.

When switch 210 is closed (or capacitive load 140-2 is otherwise connected with output 130-2), capacitive load 140-2 may draw an initial inrush current from voltage source 110 via transformer module 120-1 and output 130-2. Drawing this initial inrush current may result in the voltage provided to capacitive load 140-1 via transformer module 120-1 and output 130-1 temporarily drooping. The amount of voltage droop experienced by capacitive load 140-1 may be mitigated by transformer module 120-1. Transformer module 120-1 may be configured such that when a current is drawn by capacitive load 140-2, the magnetic flux induced by the current drawn by capacitive load 140-2 results in additional voltage being provided to capacitive load 140-1, thus mitigating the voltage droop caused by the increased load on voltage source 110.

While system 200 shows capacitive load 140-1 continuously coupled with output 130-1 and capacitive load 140-2 initially disconnected from output 130-2, it should be understood that the situation may be reversed. As such, capacitive load 140-2 may initially be coupled with output 130-2; capacitive load 140-1 may then be connected with output 130-1 while capacitive load 140-2 is using voltage source 110 as its supply voltage.

Figure 3:
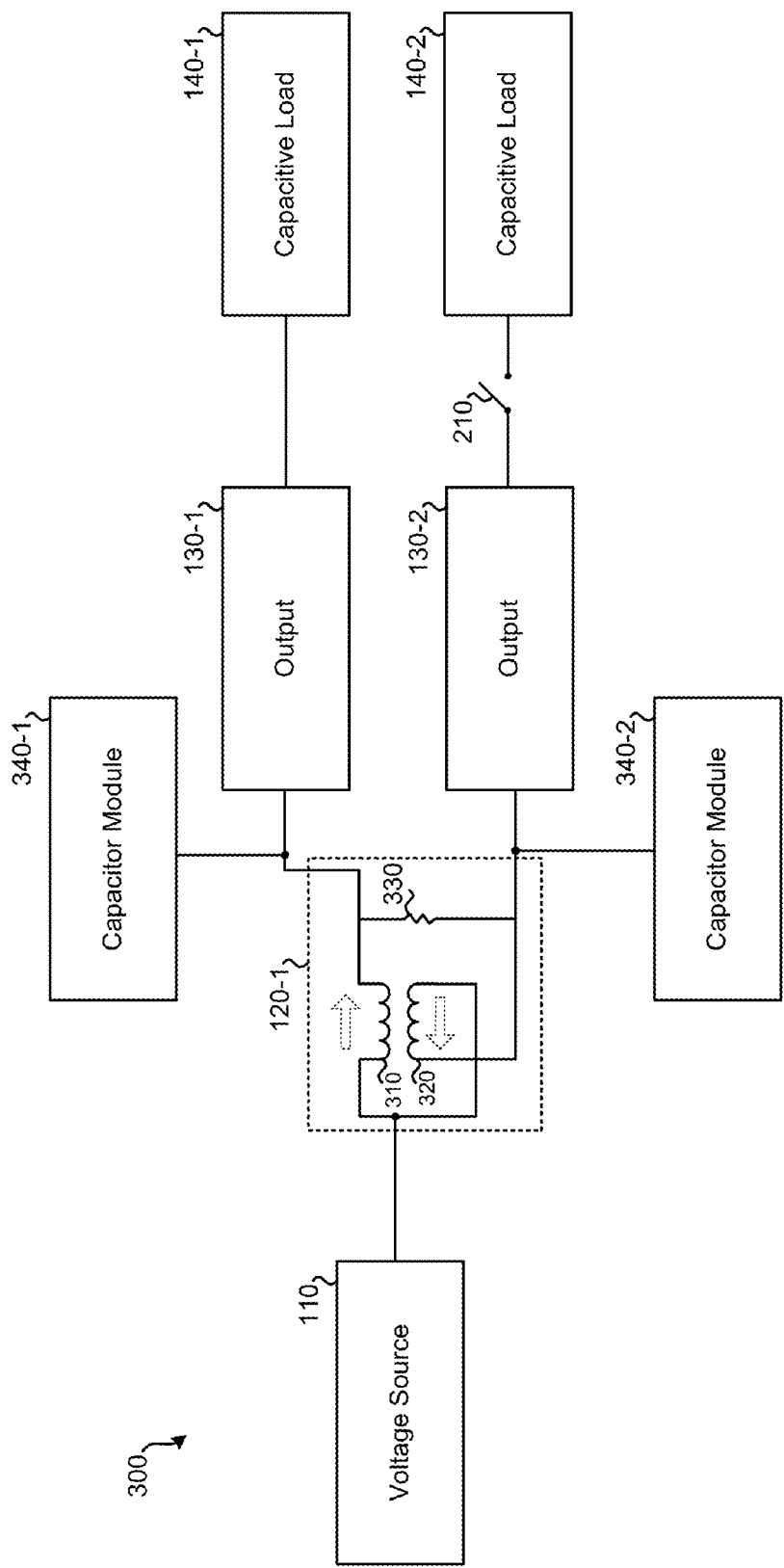
FIG. 3 illustrates a third block diagram of an embodiment of a system for mitigating voltage droop in a direct current circuit configured to power multiple capacitive loads.

FIG. 3 illustrates a block diagram of an embodiment of a system 300 for mitigating voltage droop in a direct current circuit configured to power multiple capacitive loads. System 300 may represent an embodiment of system 100 and/or system 200. In system 300, additional detail to transformer module 120-1 is illustrated. In system 300, transformer module 120-1 includes a dual winding transformer and a resistor 330, which serves as an impedance. In other embodiments, a tapped single winding transformer may be used.

Output 130-1 is electrically coupled with voltage source 110 via winding 310 of transformer module 120-1. Output 130-2 is electrically coupled with voltage source 110 via winding 320 of transformer module 120-1. As such, outputs 130 are electrically coupled with voltage source 110 via different windings of the same transformer. The direction of current flowing through winding 310 and winding 320 from voltage source 110 to capacitive loads 140 are illustrated by the dotted arrows. Due to the magnetic flux present within transformer module 120-1 caused by the current flowing to capacitive load 140-2 when switch 210 is closed, the current through winding 310 to capacitive load 140-1 may be affected such that the voltage output to capacitive load 140-1 is greater than if transformer module 120-1 was not present.

If capacitive load 140-2 was connected with output 130-2 and switch 210 was instead present between capacitive load 140-1 and output 130-1, the magnetic flux created within transformer module 120-1 caused by the inrush current flowing to capacitive load 140-1 when switch 210 was closed (thus connecting capacitive load 140-1 with output 130-1), the voltage provided by winding 320 to capacitive load 140-2 may be greater than if transformer module 120-1 was not present. As such, regardless of whether capacitive load 140-1 or capacitive load 140-2 is first connected to voltage source 110 via transformer module 120-1, the voltage droop caused by initially connecting a second capacitive load will result in less voltage droop on the other capacitive load than if transformer module 120-1 was not present.

In system 300, resistor 330 may be present as part of transformer module 120-1. In system 300, only one resistor (resistor 330) is illustrated; however, as those with skill in the art understand, a single resistor may be replaced with multiple resistors in parallel or in series. Resistor 330 may be connected between output 130-1 and output 130-2. Resistor 330 may be used to regulate the amount of voltage induced by winding 310 in winding 320 when capacitive load 140-1 is connected with output 130-1 and the amount of voltage induced by winding 320 in winding 310 when capacitive load 140-2 is connected with output 130-2. In some embodiments, it has been found that a resistance value for resistor 330 of approximately four times the supply impedance of voltage source 110 optimally mitigates voltage droop when a capacitive load is coupled with voltage source 110. In some embodiments, the transformer ratio is 1:1 while the impedance transformation ratio is 4:1. Analysis detailed later in this document indicates how the 4:1 impedance transformation ratio may be determined.

System 300 may also include capacitor modules 340 (also referred to as a set of capacitors). In system 300, a capacitor module is associated with each output of outputs 130. Each capacitor module may include one or more capacitors. While transformer module 120-1 may serve to decrease voltage droop on an output (e.g., output 130-1) when a capacitive load is initially connected with another output (e.g., output 130-2), some number of capacitors may be used to further decrease the amount of voltage droop experienced when a capacitive load is connected with an output. As such, capacitor modules 340 may be used together to decrease voltage droop. Each of capacitor modules 340 may provide less capacitance than would be necessary if transformer module 120-1 was absent. For example, in a typical USB power supply system, a minimum of 120-1 µF of capacitance on each output may be required to prevent voltage droop that exceeds USB specifications when a USB device is initially connected to the USB power supply. If system 300 is a USB power supply system, each of capacitor modules 340 may have less than 120-1 µF of capacitance because transformer module 120-1 assists in mitigating voltage droop. For example, each of capacitor modules 340 may have 110.1 µF (e.g., 10 µF, 100 µF, and 0.1 µF capacitors). In other embodiments, capacitor modules 340 may each have 110 µF, 100 µF, 90 µF, 80 µF, or some other amount of capacitance. In some embodiments, transformer module 120-1 may be sufficient to decrease the amount of voltage droop such that capacitor modules 340 are not necessary.

Figure 4:
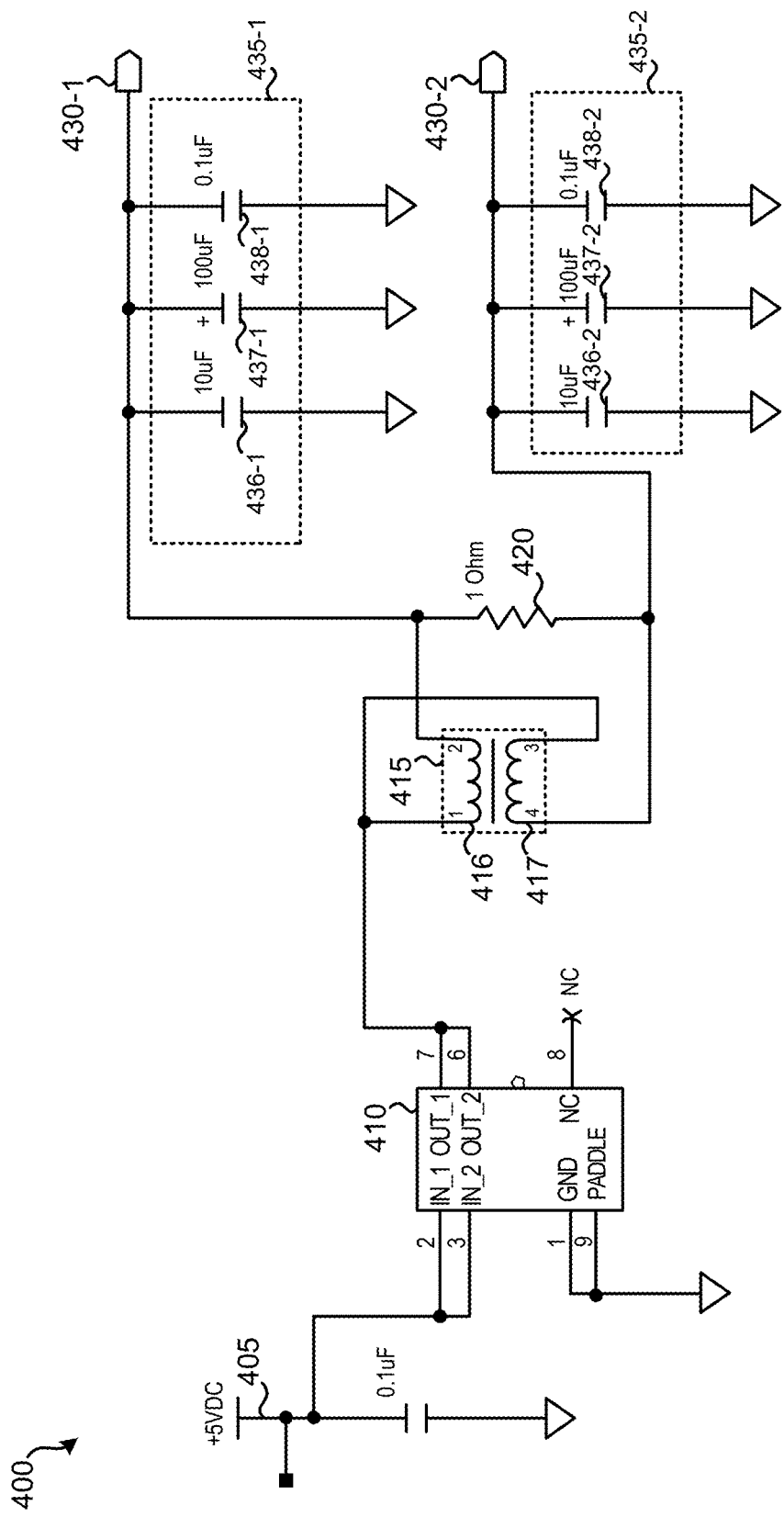
FIG. 4 illustrates a circuit diagram of an embodiment of a system for mitigating voltage droop in a USB power circuit configured to power multiple USB devices.

FIG. 4 illustrates a circuit diagram of an embodiment of a system 400 for decreasing voltage droop in a USB power circuit configured to power multiple USB devices. System 400 may be implemented on a single circuit board or may be distributed across multiple circuit boards. System 400 represents at least a portion of a USB power circuit. It should be understood that similar systems may be used to decrease the amount of voltage droop for other types of direct current power circuits, particularly those in which a capacitive load may be initially connected while another device is being powered. System 400 may represent an embodiment of system 100, system 200, and/or system 300 of FIGS. 1-3, respectively.

System 400 may receive a DC voltage from an external source or may generate the DC voltage from another AC or DC voltage source. In system 400, voltage source 405 is a +5 V DC power source. Voltage source 405 may represent voltage source 110 of FIGS. 1-3. Power switch 410 may serve to regulate current drawn from voltage source 405. Power switch 410 may decouple voltage source 405 from transformer 415 when certain conditions are satisfied, such as an excess of current being drawn or a temperature has been exceeded. For example, MP6211DN manufactured by MPS may be used for power switch 410. In FIG. 1, voltage source 110 may represent both voltage source 405 and power switch 410.

Transformer 415 may represent the transformer of transformer module 120-1 of FIGS. 1-3. Transformer 415 may be a dual-winding transformer having a 1:1 winding ratio. Transformer 415 may be wired such that current flows from terminal 1 to terminal 2 through winding 416, and that current flows from terminal 3 to terminal 4 through winding 417. As such, an increase in current through either of winding 416 or winding 417 results in an increase in current and/or voltage through the other winding, as wired. For example, transformer 415 may be TAIYO YUDEN CM04RC.

Resistor 420 may represent resistor 330 of FIG. 3 and may be part of a transformer module. Resistor 420 may serve to regulate the amount of current and/or voltage induced by winding 416 and winding 417 in the other winding. The resistance of resistor 420 may be (at least approximately) four times the impedance of voltage source 405 (the 4:1 ratio is examined later in this document). Other values of resistor 420 may also be used. In some embodiments, a resistance of 1 Ohm is used for resistor 420, such as when the impedance of the voltage source is 0.25 Ohms. In FIG. 1, transformer module 120-1 may represent both transformer 415 and resistor 420.

Outputs 430 may be electrically coupled with resistor 420, transformer 415, power switch 410, and voltage source 405. Outputs 430 may represent outputs 130 of FIGS. 1-3. If system 400 is a USB power supply circuit, outputs 430 may represent USB power output ports. Output 430-1 may be electrically connected with capacitor module 435-1, which includes capacitors 436-1, 437-1, and 438-1. Output 430-2 may be electrically connected with capacitor module 435-2, which includes capacitors 436-2, 437-2, and 438-2. Capacitors 436 may have a capacitance of 10 µF. Capacitors 437 may have a capacitance of 100 µF. Capacitors 438 may have a capacitance of 0.1 µF. As such, the total capacitance of each of capacitor modules 435 may be less than the minimum of 120-1 µF required for a USB power supply by USB specifications.

A USB device may be connected with each of outputs 430. For example, at a given time, USB device(s) may be connected with either output 430-1, output 430-2, both, or neither. In the instance of a USB device already being connected with output 430-1, and another USB device being connected with output 430-2, the USB device, due to its capacitance, may, upon connection with output 430-2, behave as a capacitive load, and thus draw an inrush current from voltage source 405 via power switch 410 and winding 417. The inrush current drawn by the USB device connected with output 430-1 may be supplied, at least in part, by: capacitor module 435-1 and voltage source 405. The draw of the inrush current by the USB device connected with output 430-2 may result in voltage droop on output 430-1. The amount of voltage droop experienced by output 430-1 may be decreased due to capacitor modules 435 and additional voltage and/or current being supplied by transformer 415 via winding 416 (due to the magnetic flux generated by the current flowing through winding 417). As such, voltage droop on output 430-1 is at least partially mitigated due to transformer 415 and capacitor modules 435.

In the instance of a USB device already being connected with output 430-2, and another USB device being connected with output 430-1, the reverse of the above paragraph may be true: the USB device, due to its capacitance, may, upon connection with output 430-1, behave as a capacitive load, and thus draw an inrush current from voltage source 405 via power switch 410 and winding 416 of transformer 415. The current drawn by the USB device already connected with output 430-2 may be supplied, at least in part, by: capacitor module 435-2 and voltage source 405. The draw of the inrush current by the USB connected with output 430-1 may result in voltage droop on output 430-2. The amount of voltage droop experienced by output 430-2 may be decreased due to capacitor modules 435 and additional voltage and/or current being supplied by transformer 415 via winding 417 (due to the magnetic flux generated by the current flowing through winding 416). As such, voltage droop on output 430-2 is at least partially mitigated due to transformer 415 and capacitor modules 435.

Figure 5:
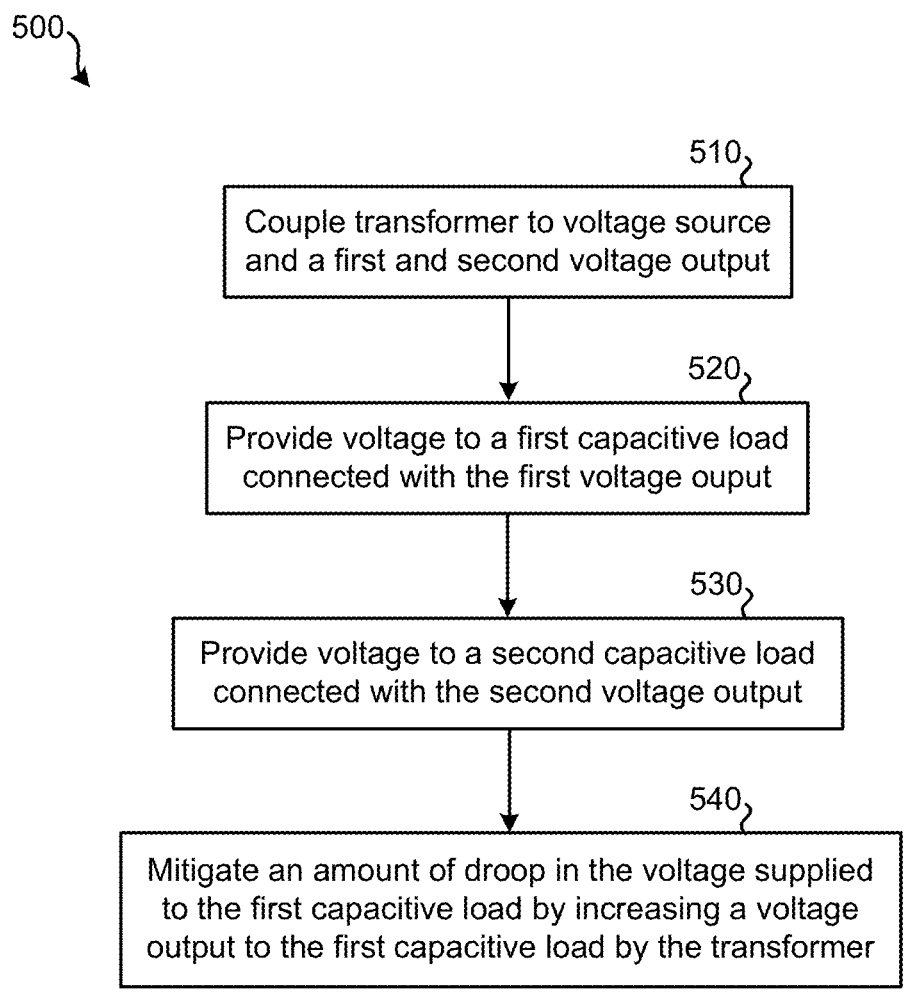
FIG. 5 illustrates an embodiment of a method for mitigating voltage droop in a direct current circuit configured to power multiple capacitive loads.

Systems 100 through 400 of FIGS. 1-4, respectively, may be used to perform various methods to mitigate voltage droop in a direct current circuit. FIG. 5 illustrates an embodiment of a method for mitigating voltage droop in a direct current circuit configured to power multiple capacitive loads. Method 500 may be performed using one of systems 100 through 400 of FIGS. 1-4, respectively, Method 500 may also be performed using a different system configured for mitigating voltage droop in a DC circuit that is configured to power multiple capacitive loads. Means for performing each step of method 500 include systems 100 through 400 and their respective components.

At step 510, a transformer may be electrically coupled with a direct current voltage source and a first and second output. The transformer may be electrically coupled with the voltage source through one or more additional components. For example, referring to system 400 of FIG. 4, transformer 415 is electrically coupled with voltage source 405 via power switch 410. The transformer used at step 510 may be a tapped single winding transformer or a dual winding transformer. The transformer may have a winding ratio of 1:1. For a dual winding transformer, the transformer may have each winding electrically coupled with the voltage source and each winding may be electrically coupled with an output. As illustrated in FIGS. 3 and 4, the transformer may be coupled with the voltage source such that current drawn by a capacitive load placed on an output through the windings of the transformer flow in opposite directions. As such, an increased current to one output will cause an increase in voltage to the other output.

At step 520, an output DC voltage may be provided to a first capacitive load connected with the first voltage output. This first capacitive load may use the received voltage as a power source. At this time, no capacitive load may be connected with the second output. As such, the voltage source may currently only be used for powering the first capacitive load connected with the first voltage output.

At step 530, a second capacitive load may be connected with the second output. The voltage source may supply this second capacitive load with a voltage (and thus current) to power the second capacitive load. Due to the voltage source not being ideal, it may not be able to provide a perfect steady-state DC voltage to the first capacitive load when the second capacitive load is connected due to the amount of initial inrush current being drawn by the second capacitive load. The first capacitive load may experience voltage droop on the first output due to the inrush current being drawn by the second capacitive load via the second output.

At step 540, the amount of droop in voltage output to the first capacitive load via the first output may be at least partially mitigated. The voltage droop may be mitigated by the transformer action, the phasing of the transaction windings, and/or the compensation impedance (such as provided by resistor 420 of FIG. 4). As such, due to the transformer, the amount of voltage droop experienced by the first output connected with the first capacitive load is less than if the transformer was not electrically coupled with the circuit at step 510. Following the initial inrush current to the second capacitive load subsiding (e.g., the capacitive load becoming charged), the voltage supply may provide each of the first and second outputs with a steady state DC voltage at approximately the voltage output by the voltage source. At some future time, if one of the capacitive loads is disconnected and the same or a different capacitive load is reconnected, method 500 may repeat.

Figure 6:
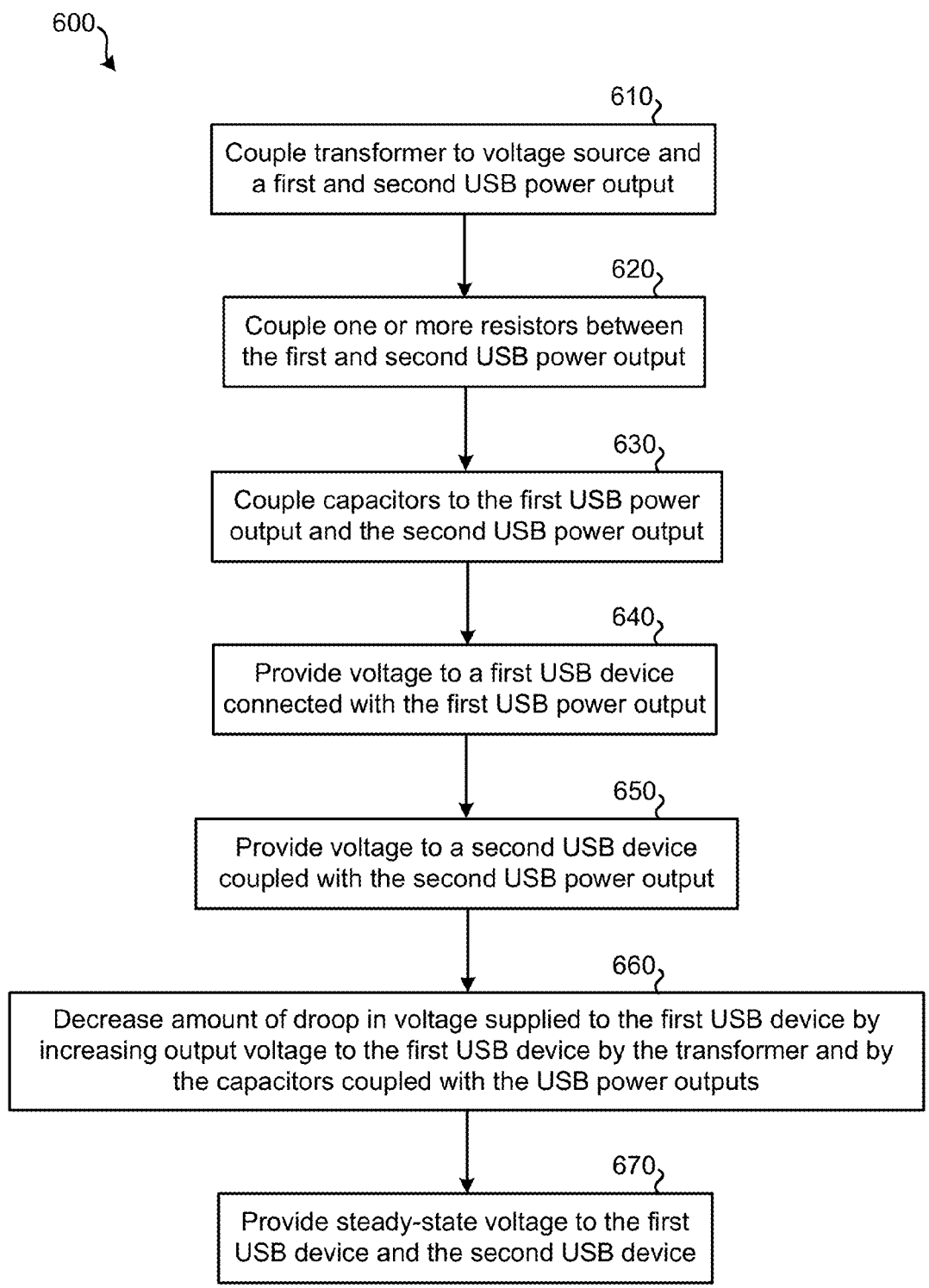
FIG. 6 illustrates an embodiment of a method for mitigating voltage droop in a USB power circuit configured to power multiple USB devices.

FIG. 6 illustrates an embodiment of a method 600 for decreasing voltage droop in a USB power circuit configured to power multiple USB devices. Method 600 may be performed using one of systems 100 through 400 of FIGS. 1-4, respectively. Method 600 may also be performed using a different system configured for mitigating voltage droop in a DC circuit that is configured to power multiple capacitive loads. Method 600 may represent an alternative embodiment of method 500. Means for performing each step of method 600 include systems 100 through 400 and their respective components.

At step 610, a transformer may be electrically coupled with a direct current voltage source and a first USB power output and a second USB power output. The transformer may be electrically coupled with the voltage source through one or more additional components. For example, referring to system 400 of FIG. 4, transformer 415 is electrically coupled with voltage source 405 via power switch 410. The transformer used at step 510 may be a tapped single winding transformer or a dual winding transformer. The transformer may have a winding ratio of 1:1. For a dual winding transformer, the transformer may have each winding electrically coupled with the voltage source and each winding may be electrically coupled with an output. As illustrated in FIGS. 3 and 4, the transformer may be coupled with the voltage source such that current drawn by a capacitive load placed on an output through the windings of the transformer flow in opposite directions.

At step 620, one or more resistors may be electrically coupled between the first output and the second output. These one or more resistors may be used to control the amount of voltage and/or current inducted by the transformer on one USB power output when a capacitive load draws an inrush current on the other USB power output. In some embodiments, the one or more resistors may have a resistance of (approximately) four times the impedance of the voltage source. In some embodiments, the voltage source impedance may be 0.25 Ohms, thus the resistance of the resistor(s) may be 1 Ohm. Analysis detailed later in this document indicates how the resistance value of four times the voltage source impedance is arrived at.

At step 630, one or more capacitors may be coupled with each of the first and second USB power outputs. Such capacitors may be used together with the transformer to mitigate voltage droop when the second USB device is connected with the second USB power output. According to USB specifications, at least 120-1 μF of capacitance is required to be coupled with each USB power output so that no more than 330 mV of voltage droop is experienced on a USB power output when a USB device (which is acting as a capacitive load) is connected with another USB power output that is electrically coupled with the same voltage source. However, due to the transformer, it may be possible to use capacitors that have less than a total of 120-1 μF of capacitance while achieving less than a maximum of 330 mV of voltage droop on a USB power output when a USB device is connected with another USB power output connected with the same voltage source. In some embodiments, 110.1 μF of capacitance may be electrically coupled with each USB power output. Such capacitance may be in the form of: one 100 μF capacitor, one 10 μF capacitor, and one 0.1 μF capacitor.

At step 640, an output DC voltage of +5 V may be provided to a first USB device connected with the first USB power output. This USB device may use the received 5 V DC as a power source. At this time, no USB device may be connected with the second USB power output. As such, the voltage source may currently only be used for powering the first USB device connected with the first USB power output.

At step 650, a second USB device may be connected with the second USB power output. The voltage source may attempt to supply this second USB device with a +5 V DC voltage. Due to the voltage source not being ideal, it may not be able to provide a perfect steady-state DC voltage to the first USB device when the second USB device is initially connected to the second USB power output due to the amount of inrush current being drawn by the second USB device, which is acting as a capacitive load. As such, the first USB device may experience voltage droop on the first USB power output due to the current being drawn by the second USB device via the second output.

At step 660, the amount of droop in voltage output to the first USB device via the first USB power output may be at least partially mitigated. The voltage droop may be mitigated by the transformer being induced by the current through the second winding to the second USB power output to output a greater voltage to the first USB power output. As such, due to the transformer, the amount of voltage droop experienced by the first USB power output connected with the first USB device is less than if the transformer was not electrically coupled with the circuit at step 610.

Further, at step 660, the voltage droop to the first USB device may be further mitigated by capacitors being present on the first and second USB power outputs. Current drawn by the second USB device may at least partially supplied by the capacitors coupled with the second USB power output thus decreasing the amount of current drawn by the second USB device through the transformer from the voltage supply. Capacitors coupled with the first USB power output may also help mitigate voltage droop to the first USB device. As such, the capacitors may work in combination with the transformer to mitigate voltage droop output by the first USB power output to the first USB device.

At step 670, following the initial inrush current to the second USB device subsiding (e.g., the capacitors of the second USB device becoming charged), the voltage supply may provide the first and second outputs with a steady state +5 V DC. At some future time, if one of the capacitive loads is disconnected and the same or a different capacitive load is reconnected, method 600 may repeat. It should be understood that if the first USB device is disconnected from the first USB power output and the first USB device (or another USB device) is then (re)connected to the first USB power output, references to the "first" and "second" in steps 640 through 660 would be reversed.

Figure 7:
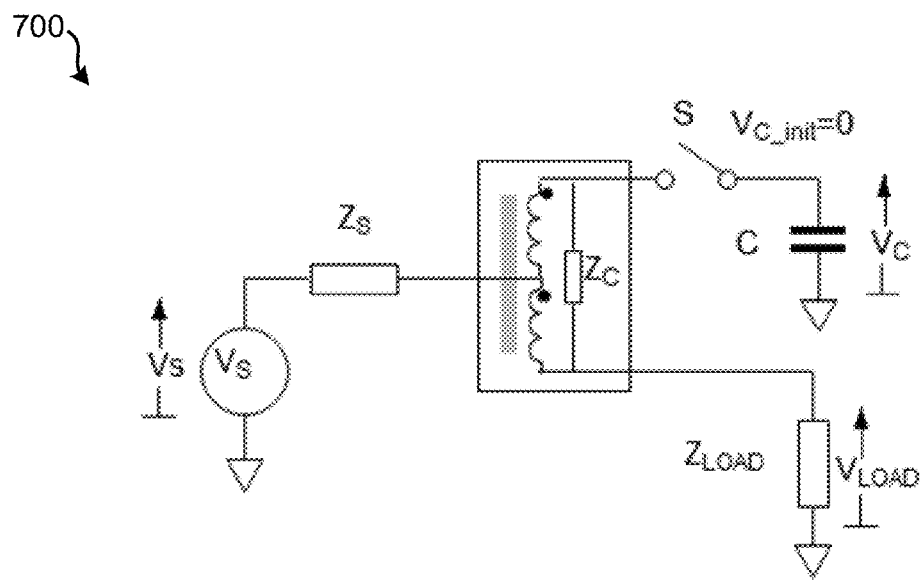
FIG. 7 illustrates a circuit diagram of an embodiment of a system for mitigating voltage droop in a power circuit configured to power capacitive loads.
Figure 8:
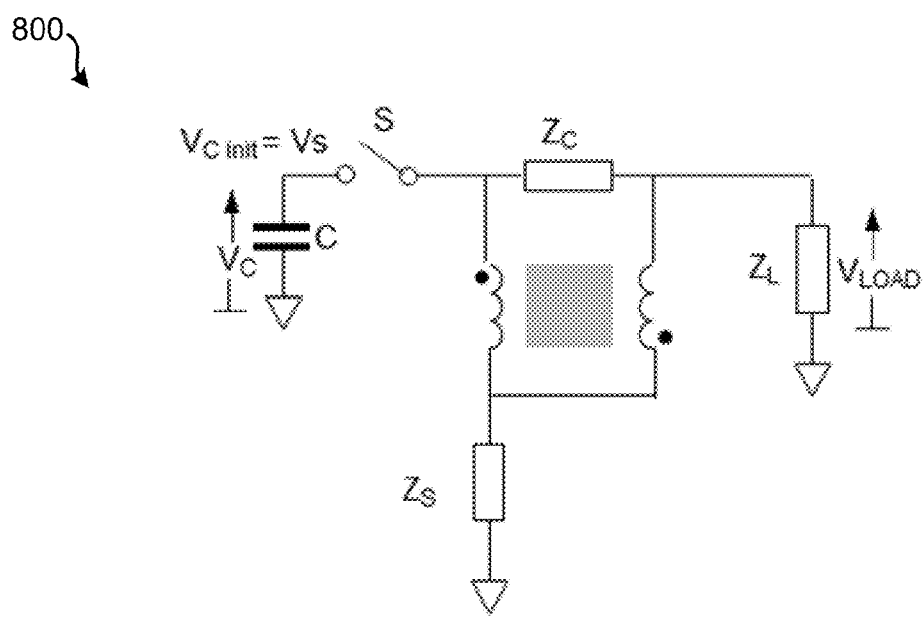
FIG. 8 illustrates an embodiment of the circuit diagram of FIG. 7 reorganized for transient analysis.
Figure 9:
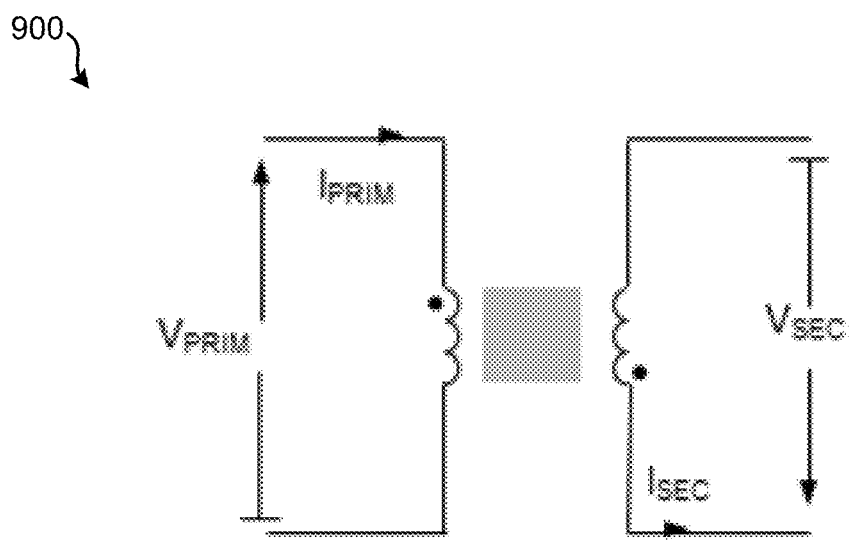
FIG. 9 illustrates a circuit diagram of an embodiment of a transformer.
Figure 10:
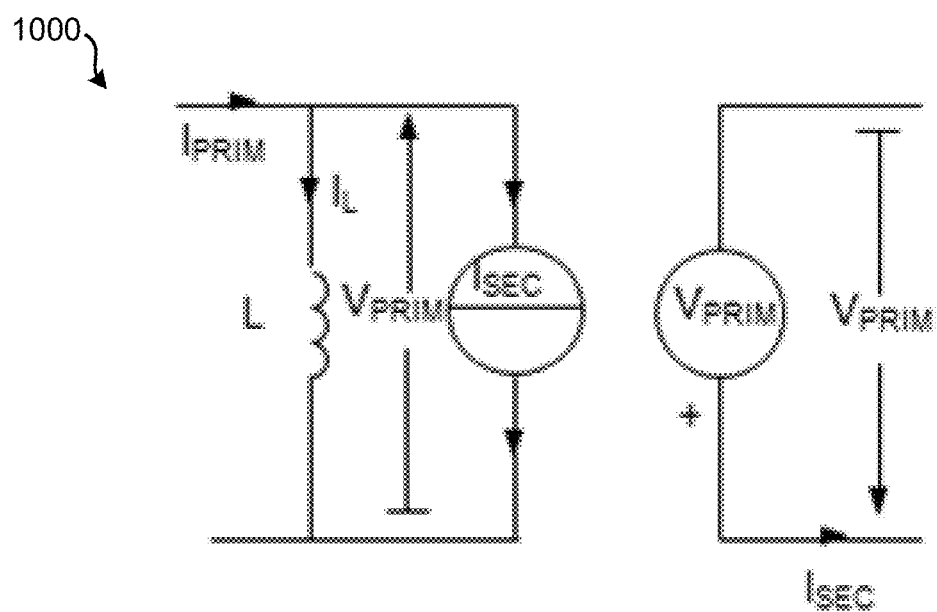
FIG. 10 illustrates another circuit diagram of an embodiment of an embodiment of a transformer.
Figure 11:
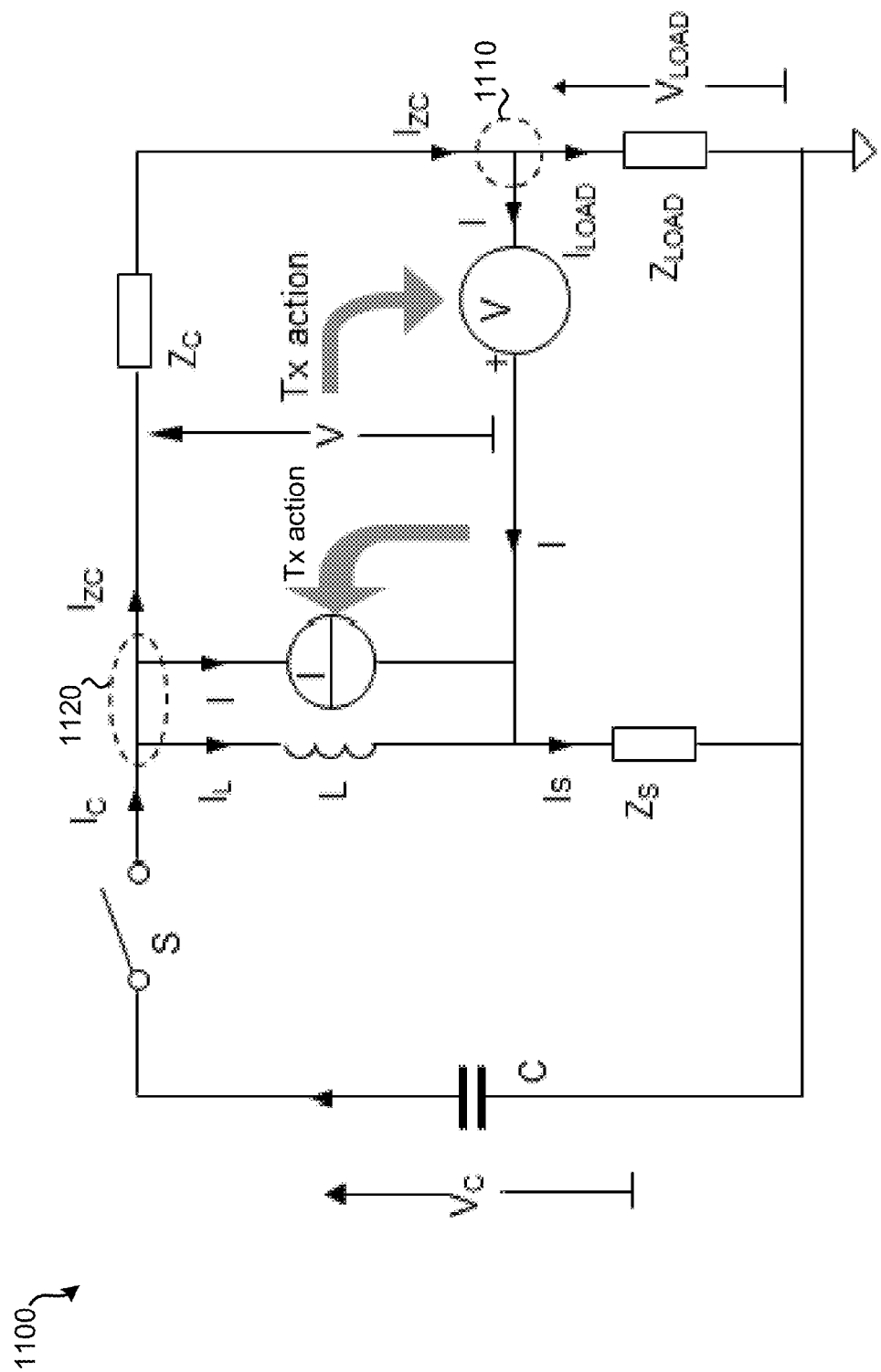
FIG. 11 illustrates an embodiment of the circuit diagram of FIG. 8 combined with the circuit diagram of FIG. 10.

As previously indicated, the impedance value of four times the voltage source impedance may be determined via trial and error or calculation. FIGS. 7 through 11 detail how the 4:1 ratio of impedance across transformer to voltage source impedance may be calculated. FIG. 7 illustrates an embodiment of circuit 700, similar to systems 200 through 400 of FIGS. 2 through 4, respectively, where a capacitive load (initially having zero voltage) is connected with a circuit having a transformer module including a transformer and impedance (e.g., resistor) across the outputs of the circuit. Circuit 800 of FIG. 8 represents circuit 700 of FIG. 7 redrawn to facilitate a transient analysis. FIG. 9 illustrates an embodiment of the voltages in a transformer, such as the transformer of FIGS. 7 and 8. FIG. 10 represents an embodiment of an ideal 1:1 transformer 1000. Transformer 1000 illustrates the transformer action of the primary voltage being coupled to the secondary voltage and the primary current being coupled to the secondary current. L represents the mutual inductance. FIG. 11 illustrates circuit 1100, which is a combination of transformer 1000 being used to represent the transformer in circuit 800 of FIG. 8. As such, circuit 1100 represents circuit 700.

In circuit 1100, the capacitive load is represented C, and its voltage by $V_C$. The capacitive load already connected with circuit 1100 is represented by $Z_{LOAD}$, with the voltage across $Z_{LOAD}$ being $V_{LOAD}$. $Z_S$ represents the voltage source impedance. At time zero (t=0), the switch, S, may be closed, thus connecting capacitive load C to with the remainder of circuit 1100. Ideally, when C is connected with the remainder of circuit 700, $V_{LOAD}$ is desired to remain at zero (that is, maximum isolation between $V_C$ and $V_{LOAD}$). Since the transformer initially has no current passing through it, it is known $I_L=0$.

Continuing to refer to FIG. 1100, according to Ohm's law, it is known that if $V_{LOAD}$ is zero, then $I_{LOAD}$ is also zero. According to Norton's theorem, equation 1 can be calculated; that is, the currents entering node 1110 must equal the currents leaving node 1110.

$$I_{ZC} - I - I_{LOAD} = 0 \quad \text{Eq. 1}$$

Therefore, according to equation 1, since $I_{LOAD}=0$, $I_{ZC}=I$. At node 1120-1, also according to Norton's Theorem, equation 2 can be calculated.

$$I_C - I_L - I - I_{ZC} = 0 \quad \text{Eq. 2}$$

Since $I_L$ is known to be zero, and $I_{ZC}=I$, equation 3 is determined from equation 2.

$$I_C = 2I \quad \text{Eq. 3}$$

Referring to voltage loop around $Z_C$, equation 4 can be determined based on Thevenin's theorem:

$$I \cdot Z_C - 2V = 0 \quad \text{Eq. 4}$$

Therefore: $I \cdot Z_C = 2V$.

Referring to the voltage loop around $Z_S$, equation 5 can be determined based on Thevenin's theorem:

$$I_C \cdot Z_S - V - V_{LOAD} = 0 \quad \text{Eq. 5}$$

Equation 6 may be created by combining equations 3 and 5 and by using the fact that $V_{LOAD}$ is zero:

$$V = 2 \cdot I \cdot Z_S \quad \text{Eq. 6}$$

Combing equations 6 and 4, equation 7 is created:

$$Z_C = 4 \cdot Z_S \quad \text{Eq. 7}$$

Accordingly, with ideal components the impedance across the transformer outputs is four times the impedance of the supply voltage to minimize the voltage change at $Z_{LOAD}$ when capacitive load C is connected at t=0. When non-ideal components are used, this 4:1 ratio of compensating impedance $Z_C$ to source impedance $Z_S$ may change.

The previous circuits focus on two capacitive loads being present: one being already connected to the voltage source at a time, and a second capacitive load being connected with the voltage source at a later time. FIGS. 12A-12E illustrate embodiments 1200A through 1200E of how greater numbers of capacitive loads may be connected with a single voltage source and utilize similar circuits as described herein to maximize isolation between capacitive loads. Each of transformer modules 120 (labeled "modules" for short), which may contain a transformer and one or more resistors, such as illustrated in FIG. 3, may be connected as shown to isolate multiple capacitive loads. Each module may represent a transformer with an impedance (e.g., one or more resistors) across the transformer, such as illustrated in FIG. 3.

Figure 12A:
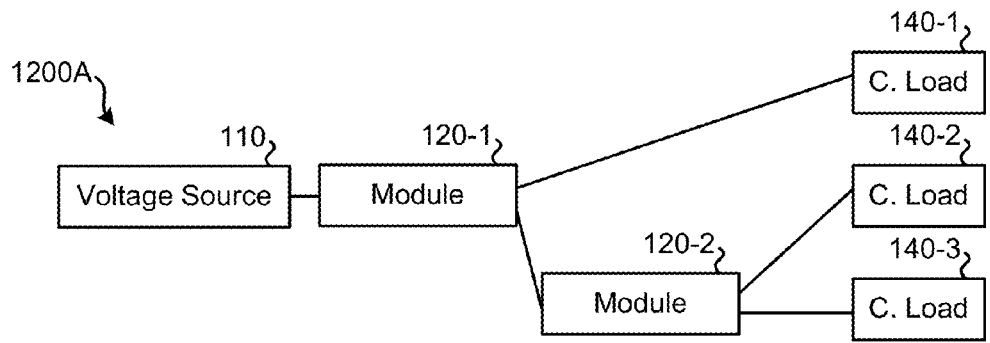
FIGS. 12A-12E illustrate circuit diagrams of embodiments of systems for mitigating voltage droop.
Figure 12B:
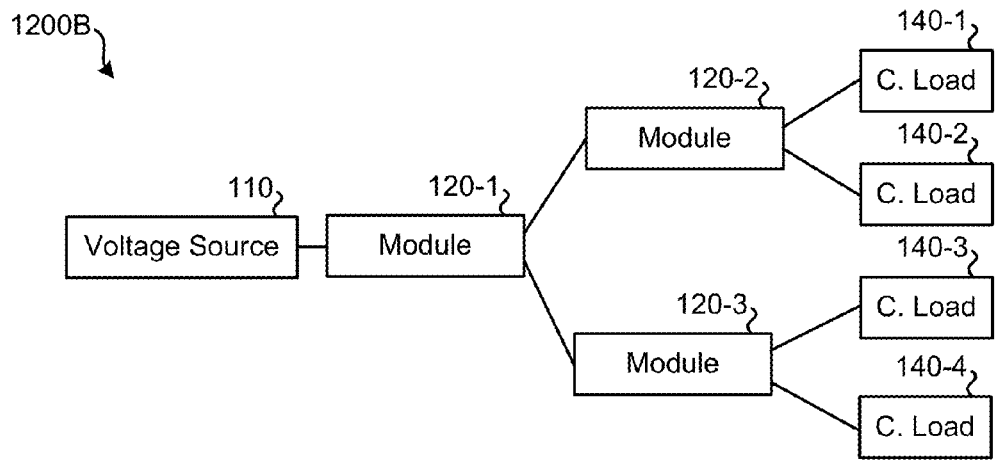
Figure 12C:
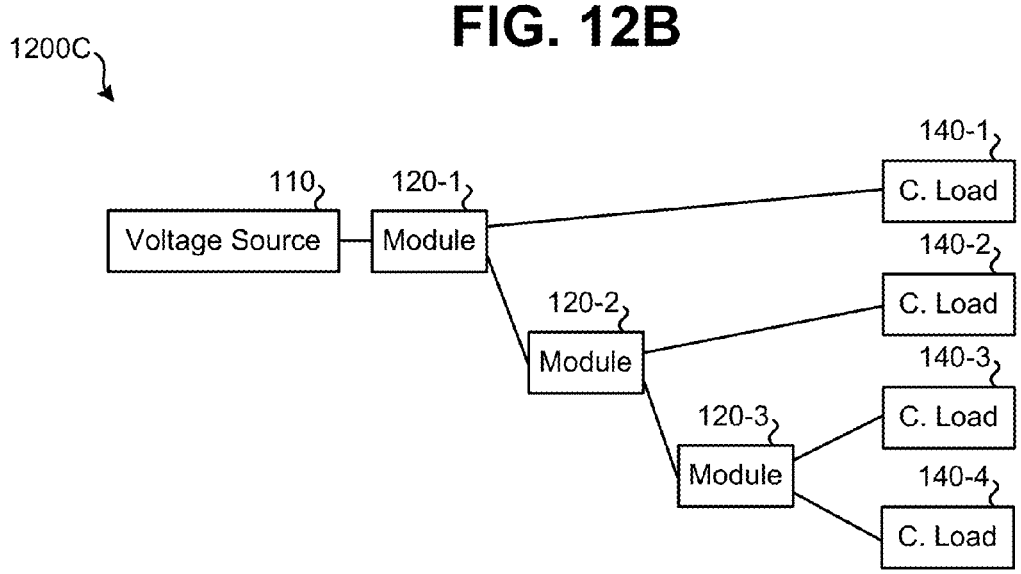
Figure 12D:
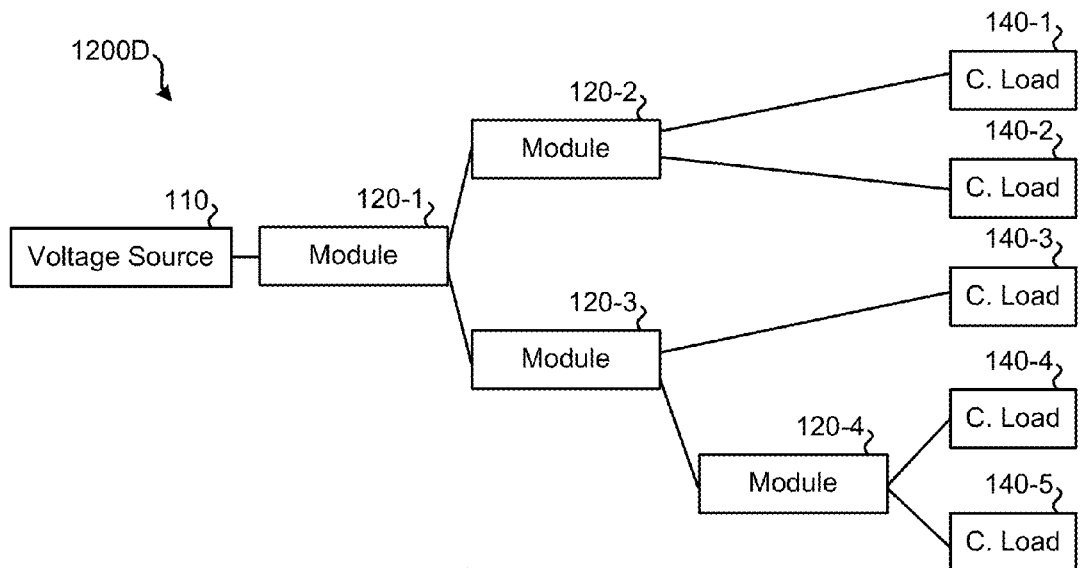
Figure 12E:
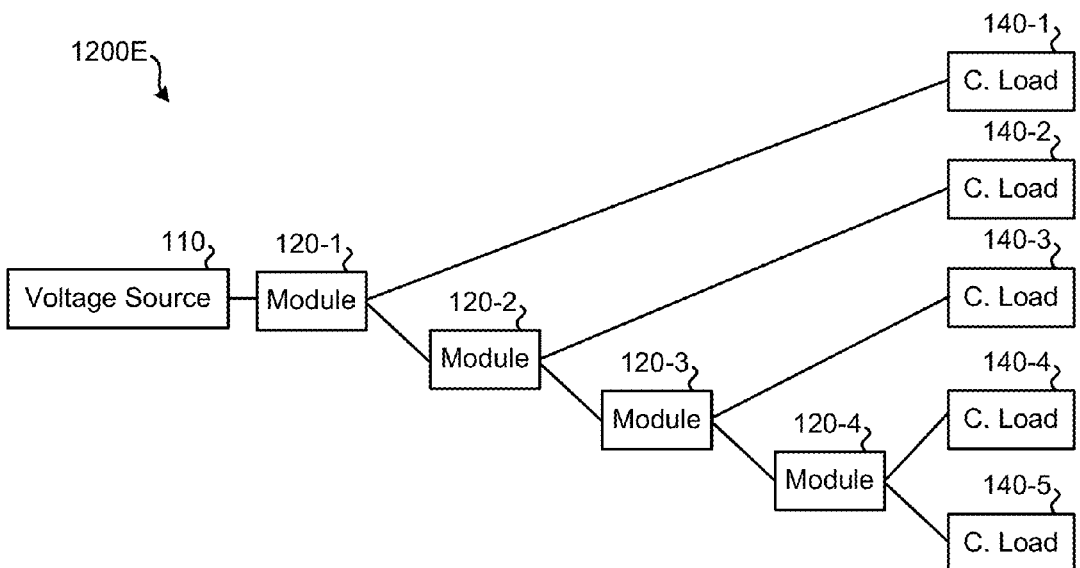

In FIG. 12A, circuit 1200A contains two transformer modules 120-1 and 120-2 that may be connected as shown to isolate three capacitive loads (140-1, 140-2, and 140-3) from each other. As such, the outputs of transformer module 120-1 are connected with another transformer module 120-2 and capacitive load 140-1, respectively. The outputs of transformer module 120-2 are connected with capacitive loads 140-2 and 140-3. In FIG. 12B, circuit 1200B contains three transformer modules that may be connected in a hierarchy to isolate four capacitive loads. The outputs of transformer module 120-1 may be connected with transformer modules 120-2 and 120-3. The outputs of transformer modules 120-2 and 120-3 may each be connected with a capacitive load of capacitive loads 140. In FIG. 12C, circuit 1200C contains a cascade of transformer modules that may be connected such that an output of each transformer module is connected to a capacitive load and the other output of each transformer module is connected to another transformer module (with the outputs of transformer module 120-3 each being connected to a capacitive load). In FIG. 12D, circuit 1200D contains an odd number of capacitive loads that are isolated by using a hierarchy of transformer modules. In circuit 1200D, the outputs of transformer module 120-1 are connected to transformer modules 120-2 and 120-3. One output of transformer module 120-3 is connected to the voltage input of transformer module 120-4. The remaining outputs of the transformer modules are each connected to a capacitive load of capacitive loads 140. In FIG. 12E, circuit 1200E contains five capacitive loads which are isolated using a cascade arrangements of transformer modules 120 similar to circuit 1200C. It should be understood that different numbers of capacitive loads may be isolated using circuit arrangements as detailed in FIGS. 12A-12E.

It should be noted that the methods, systems, and circuits discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Further, the preceding description focuses on USB power circuits; however, it should be understood that various embodiments described herein may be adapted to mitigate voltage droop for other forms of DC circuits where a capacitive load may be electrically coupled with a voltage supply while the voltage supply is providing a voltage to another output.

Also, it is noted that the embodiments may be described as a method which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, firmware, or any combination thereof.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for mitigating voltage droop in a direct current circuit configured to power multiple capacitive loads, the system comprising:
   a voltage source configured to output a direct current voltage to power the multiple capacitive loads, wherein
      the multiple capacitive loads comprise a first capacitive load and a second capacitive load;
   a first output electrically coupled with the voltage source such that the first output, when electrically coupled with the first capacitive load, provides a first voltage to the first capacitive load;
   a second output electrically coupled with the voltage source such that the second output, when electrically coupled with the second capacitive load, provides a second voltage to the second capacitive load; and
   a transformer module, comprising an impedance, electrically coupled with the first output and the second output, wherein:
      the impedance of the transformer module is at least partially created by one or more resistors;
      the one or more resistors are electrically connected between the first output and the second output; and
      when the first capacitive load is electrically coupled with the first output, the transformer module is configured to mitigate droop of the first voltage to the first output upon the second capacitive load being connected to the second output and receiving inrush current.

2. The system for mitigating voltage droop in the direct current circuit configured to power multiple capacitive loads of claim 1, wherein the first output and the second output are Universal Serial Bus (USB) outputs and the first capacitive load and the second capacitive load are each USB devices.

3. The system for mitigating voltage droop in the direct current circuit configured to power multiple capacitive loads of claim 1, wherein:
   when the second capacitive load is electrically coupled with the second output, the transformer module is further configured to mitigate droop of the second voltage to the second output upon the first capacitive load being electrically coupled to the first output and receiving a second inrush current.

4. The system for mitigating voltage droop in the direct current circuit configured to power multiple capacitive loads of claim 1, wherein:
   the first output is connected to capacitors that provide less than 120 µF in capacitance on the first output; and
   the second output is connected to capacitors that provide less than 120 µF in capacitance on the second output.

5. The system for mitigating voltage droop in the direct current circuit configured to power multiple capacitive loads of claim 1, wherein:
   the first output is not connected to any capacitors; and
   the second output is not connected to any capacitors.

6. The system for mitigating voltage droop in the direct current circuit configured to power multiple capacitive loads of claim 1, wherein the transformer module comprises either a tapped single winding transformer or a dual winding transformer.

7. The system for mitigating voltage droop in the direct current circuit configured to power multiple capacitive loads of claim 1, wherein the one or more resistors have a resistance of approximately four times an impedance of the voltage source.

8. A method for mitigating voltage droop in a direct current (DC) circuit configured to power multiple capacitive loads, the method comprising:
   coupling a transformer module with a DC voltage source, a first DC output, and a second DC output, wherein:
      the transformer module comprises an impedance;
      the impedance of the transformer module is at least partially created by one or more resistors;
   providing a first output DC voltage to a first capacitive load connected with the first DC output;
   providing a second output DC voltage to a second capacitive load connected with the second DC output, wherein:
      the one or more resistors are electrically connected between the first output DC voltage and the second output DC voltage;
      the second capacitive load is connected with the second DC output after the first capacitive load was connected with the first DC output, and
      upon connecting with the second DC output, the second capacitive load draws an inrush current from the DC voltage source;
   mitigating, by the transformer module, droop in the first output DC voltage provided to the first capacitive load, wherein
      mitigation of the amount of droop is at least partially due to magnetic flux induced by the inrush current increasing the first output DC voltage.

9. The method for mitigating voltage droop in the DC circuit configured to power multiple capacitive loads of claim 8, wherein:
   the first DC output and the second DC output are Universal Serial Bus (USB) outputs,
   the first capacitive load is a first USB device, and
   the second capacitive load is a second USB device.

10. The method for mitigating voltage droop in the DC circuit configured to power multiple capacitive loads of claim 8, further comprising:
   disconnecting the first capacitive load from the first DC output;
   connecting a third capacitive load to the first DC output;
   providing a third output DC voltage to the third capacitive load connected with the first DC output, wherein:
      the third capacitive load is connected with the first DC output after the second capacitive load was connected with the second DC output, and
      upon connecting with the first DC output, the third capacitive load draws a second inrush current from the DC voltage source;

mitigating, by the transformer module, a second amount of droop in the second output DC voltage provided to the second capacitive load, wherein mitigation of the amount of droop is at least partially due to magnetic flux induced by the second inrush current increasing the second output DC voltage.

11. The method for mitigating voltage droop in the DC circuit configured to power multiple capacitive loads of claim 8, wherein:

the first DC output is connected to capacitors that provide less than 120 µF in capacitance on the first DC output; and the second DC output is connected to capacitors that provide less than 120 µF in capacitance on the second DC output.

12. The method for mitigating voltage droop in the DC circuit configured to power multiple capacitive loads of claim 8, wherein:

the first DC output is not connected to any capacitors; and
the second DC output is not connected to any capacitors.

13. The method for mitigating voltage droop in the DC circuit configured to power multiple capacitive loads of claim 8, wherein the transformer module comprises either a tapped single winding transformer or a dual winding transformer.

14. The method for mitigating voltage droop in the DC circuit configured to power multiple capacitive loads of claim 8, wherein the one or more resistors have a resistance of approximately four times an impedance of the DC voltage source.

15. A circuit for mitigating voltage droop in a universal serial bus (USB) power circuit configured to power multiple USB devices, the circuit comprising:

a voltage source configured to output a direct current voltage to power the multiple USB devices, wherein
the multiple USB devices comprise a first USB device and a second USB device;

a first USB power output electrically coupled with the voltage source such that the first USB power output, when connected with the first USB device, provides a first DC voltage to the first USB device;

a second USB power output electrically coupled with the voltage source such that the second USB power output, when connected with the second USB device, provides a second voltage to the second USB device; and a transformer module, comprising an impedance, electrically coupled with the first USB power output and the second USB power output, wherein:

the impedance comprises one or more resistors electrically coupled between the first USB power output and the second USB power output; and when the first USB device is electrically coupled with the first USB power output, the transformer module is configured to mitigate droop of the first DC voltage to the first USB power output upon the second USB device being connected to the second USB power output and receiving inrush current.

16. The circuit for mitigating voltage droop in the USB power circuit configured to power multiple USB devices of claim 15, the circuit further comprising:

a power switch electrically coupled with the voltage source, wherein the power switch is configured to regulate an amount of current supplied to the first USB power output and the second USB power output.

17. The circuit for mitigating voltage droop in the USB power circuit configured to power multiple USB devices of claim 15, the circuit further comprising:

a first set of capacitors connected with the first USB power output, wherein the first set of capacitors provides the first USB power output with less than 120 µF of capacitance; and a second set of capacitors connected with the second USB power output, wherein the second set of capacitors provides the second USB power output with less than 120 µF of capacitance.

18. The circuit for mitigating voltage droop in the USB power circuit configured to power multiple USB devices of claim 15, wherein the impedance between the first USB power output and the second USB power output is four times an impedance of the voltage source.

* * * * *